Figure 1:
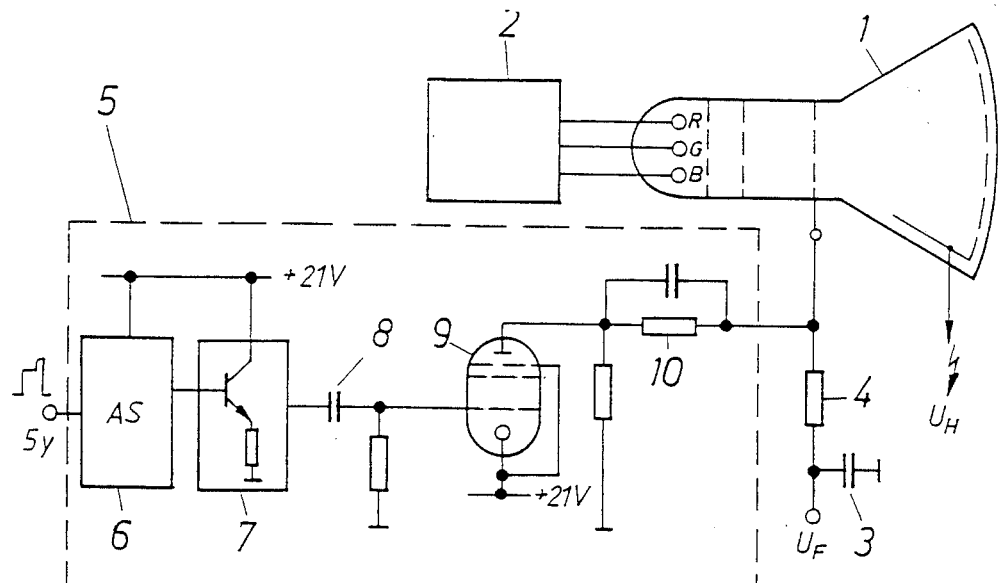

United States Patent [19]

Hartmann et al.

[11] Patent Number: 4,987,350
[45] Date of Patent: Jan. 22, 1991

[54] PICTURE REPRODUCTION APPARATUS WITH A CATHODE RAY TUBE AND AN ARRANGEMENT FOR MEASURING THE BEAM CURRENT

[75] Inventors: Uwe Hartmann, Untergriesbach; Fritz Ohnemus, Villingen-Schwenningen, both of Fed. Rep. of Germany

[73] Assignee: Deutsche Thomson-Brandt GmbH, Villingen, Fed. Rep. of Germany

[21] Appl. No.: 402,075

[22] Filed: Sep. 1, 1989

[30] Foreign Application Priority Data

Sep. 3, 1988 [DE] Fed. Rep. of Germany ....... 3830074

[51] Int. Cl.⁵ .................. G09G 1/04; H01J 29/58
[52] U.S. Cl. ................................ 315/382; 315/383
[58] Field of Search ............. 315/382, 381, 383, 379, 315/386; 358/29

[56] References Cited

U.S. PATENT DOCUMENTS

| 4,540,919 | 9/1985 | Ryan | 315/381 |
| 4,763,048 | 8/1988 | Schiller | 315/383 |
| 4,827,183 | 5/1989 | Seats | 313/431 |

*Primary Examiner*—Gregory C. Issing
*Attorney, Agent, or Firm*—Max Fogiel

[57] ABSTRACT

A video-display unit in which the beam current of a cathode-ray tube is measured for a predetermined time interval during display of some lines exterior to an image, for establishing automatic cutoff for the electronic beam. This electron beam is defocused during that predetermined time interval, and the defocusing is independent of the contents of the image, so that initial lines are substantially invisible. An electronic switch may be provided for decreasing the focusing voltage of the cathode ray tube. The electronic switch may be a high-vacuum tube connected to the focusing electrode of the cathode-ray tube, or this switch may be a transistor connected through a transformer to the focusing electrode. The transformer may be attenuated.

7 Claims, 1 Drawing Sheet

PICTURE REPRODUCTION APPARATUS WITH A CATHODE RAY TUBE AND AN ARRANGEMENT FOR MEASURING THE BEAM CURRENT

The invention concerns a video-display unit with a cathode-ray tube and with circuitry for measuring the beam current for a specific interval of time, especially during some of the lines exterior to the image being displayed, for the purpose of automatically establishing a cutoff for the electron-beam system.

The efficiencies of the coating of phosphor on the inner surface of the cathode-ray tube in a video-display unit vary from tube to tube as the result of manufacturing tolerances. The efficiency of the coating in a single tube can even vary over its operating life. Units of this type are accordingly provided with automatic controls that maintain efficiency at low luminance. Maintaining a constant efficiency is especially important in color cathode-ray tubes with three guns, one each for red, green, and blue, in order to prevent color-registration errors, especially at low luminance. The cutoffs for each of the three guns must be precisely adjusted to those of the other two. Since the human eye is especially sensitive to color-registration errors when luminance is low, it is particularly important to establish and maintain correct cutoffs in color picture tubes. The optimum cutoff will differ from system to system due to the difference in the efficiencies of the phosphor coatings. Each specific cutoff corresponds to a very particular beam current, which is measured and which is maintained constant by a loop. This current is on the order of 30 $\mu$A. It is measured by generating test beams that correspond to the cutoff during the occurrence of specific lines, one line per system in a three-gun tube. In conventional television receivers this occurs during the invisible forward stroke of the beams, outside, that is, of the picture component that is to be displayed, during the 17th, 18th, or 19th line for instance. This is possible because, since the beams usually travel beyond the edges of the screen, the test lines remain invisible even though the test circuit continues to process the beam currents during these lines. The situation is different with what are called monitors, however. The screen of a monitor is larger than the frame being displayed, and the test lines may become irritatingly apparent.

The object of the invention is accordingly to eliminate these irritating aspects of the test lines. This object is attained by the measure recited in the major claim. Additional advantageous embodiments of the invention are recited in the subsidiary claims.

The invention will now be described with reference to the drawing, wherein

FIG. 1 illustrates one embodiment and

Figure 2:
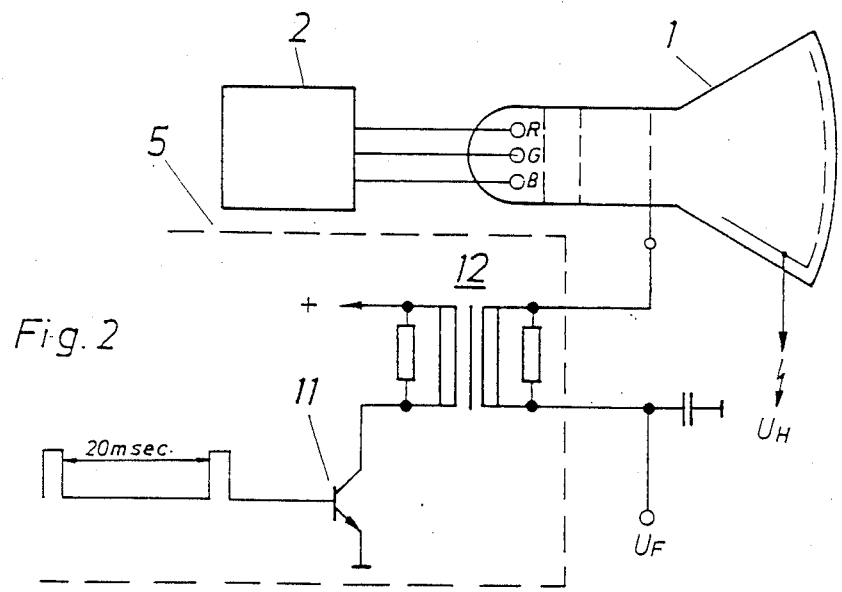

FIG. 2 another embodiment of the invention.

FIG. 1 illustrates a color picture tube 1 with three guns R, G, and B controlled by a video output stage 2. In addition to certain unspecified grid contacts, tube 1 has a high-voltage contact $U_H$ and a contact for a focusing voltage $U_F$ at capacitor 3 by way of resistor 4. The spot focus of the electron beams arriving at the screen will be most precise when the focusing voltage, obtained from an unillustrated line transformer, is optimum.

The invention provides for a circuit 5 that strictly decreases focusing while the test beams are being generated. This is attained by squeezing the conventional 5 kV focusing voltage to a constant lower level. A vertical blanking pulse is obtained for this purpose from synchronization pulse Sy by an amplitude filter 6 and activates, by way of a driver stage 7 and differentiator stage 8, a high-vacuum tube 9. The tube's cathode is connected to the 21-V bar that is in every video-display unit, and the pulsed 21 V will occur at the picture tube's focusing electrode by way of a transformer 10. The result is such a decrease in the focus of the electron beams that they will no longer be visible because the beam current is extremely low at that time.

FIG. 2 illustrates an embodiment incorporating a switching transistor 11 that communicates by way of a transformer 12 with the focusing electrode of cathode-ray tube 1. A negative pulse voltage is coupled into the secondary winding 13 of transformer 12 during vertical blanking. Transformer 12 is attenuated to prevent the pulse from decaying disruptively.

We claim:

1. A video-display unit comprising: a cathode-ray tube with electron beam means; means for measuring beam current of said cathode-ray tube for a predetermined time interval during predetermined lines exterior to an image being displayed for establishing automatic cutoff for said electron beam means; and means for defocusing an electron beam from said electron beam means during said predetermined time interval, said defocusing being independent of contents of said image so that initial ones of said lines are substantially invisible, said lines being generated inside said video-display unit and being located outside said image being displayed, said lines being free of contents of said image and thereby independent of the contents, said lines to be made invisible by said defocusing and being introduced into said cathode-ray tube for measuring said beam current.

2. A video-display unit as defined in claim 1, including an electronic switch; said defocusing means decreasing focusing voltage of said cathode-ray tube with said electronic switch.

3. A video-display unit as defined in claim 2, wherein said cathode-ray tube has a focusing electrode; said electronic switch comprising a high-vacuum tube connected to said focusing electrode.

4. A video-display unit as defined in claim 2, wherein said cathode-ray tube has focusing electrode; said electronic switch comprising a transistor connected through a transformer to said focusing electrode.

5. A video-display unit as defined in claim 4, wherein said transformer is damped against oscillations.

6. A video-display unit comprising: a cathode-ray tube with electron beam means; means for measuring beam current of said cathode-ray tube for a predetermined time interval during predetermined lines exterior to an image being displayed for establishing automatic cutoff for said electron beam means; and means for defocusing an electron beam from said electron beam means during said predetermined time interval, said defocusing being independent of contents of said image so that initial ones of said lines are substantially invisible; an electronic switch; said defocusing means decreasing focusing voltage of said cathode-ray tube with said electronic switch; said cathode-ray tube having a focusing electrode, said electronic switch comprising a transistor connected through a transformer to said focusing electrode; said transformer being damped against oscillations, said lines being generated inside said video-display unit and being located outside said image being displayed, said lines being free of contents of said image and thereby independent of the contents, said lines to be made invisible by said defocusing and being introduced into said cathode-ray tube for measuring said beam current.

7. A video-display unit comprising: a color picture tube with three guns controlled by a video output stage; said picture tube having grid contacts and a high-voltage contact as well as a contact for a focusing voltage; said picture tube having a screen and electron beams with a spot focus, said spot focus of said electron beams arriving at said screen being most precise when said focusing voltage is optimum; defocusing means for decreasing focusing while test beams are being generated by setting the focusing voltage to a constant lower level; a high-vacuum tube; an amplitude filter for producing a vertical blanking pulse from a synchronization pulse, said vertical blanking pulse activating said high-vacuum tube through a driver stage and a differentiator stage; said picture tube being connected to pulsed means occurring at said picture tube's focusing electrode through a switching transformer; said electron beams becoming invisible due to low beam current when decreasing focus of said electron beams; a switching transistor communicating with said focusing electrode through said switching transformer, said switching transformer having a secondary winding, a negative pulse voltage being coupled into said secondary winding during vertical blanking, said switching transformer being damped against oscillations to prevent said negative pulse voltage from decaying disruptively.

* * * * *